(12) United States Patent
Sigmund et al.

(10) Patent No.: US 8,798,238 B2
(45) Date of Patent: Aug. 5, 2014

(54) CALL HANDLING TREATMENT FOR VOICEMAIL SYSTEMS

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/160,956

(22) PCT Filed: Jun. 30, 2008

(86) PCT No.: PCT/US2008/068738
§ 371 (c)(1),
(2), (4) Date: Jul. 15, 2008

(87) PCT Pub. No.: WO2010/002382
PCT Pub. Date: Jan. 7, 2010

(65) Prior Publication Data
US 2011/0085646 A1 Apr. 14, 2011

(51) Int. Cl.
*H04M 1/64* (2006.01)
*H04M 3/42* (2006.01)
*H04M 3/533* (2006.01)

(52) U.S. Cl.
CPC .......... *H04M 3/42102* (2013.01); *H04M 3/533* (2013.01)
USPC .................................. 379/88.08; 379/201.02

(58) Field of Classification Search
USPC ........ 379/88.22, 201.02, 211.02, 88.08, 88.1, 379/88.18
See application file for complete search history.

(56) References Cited

U.S. PATENT DOCUMENTS

| 5,329,579 A | 7/1994 | Brunson |
| 5,524,137 A | 6/1996 | Rhee |

(Continued)

FOREIGN PATENT DOCUMENTS

| EP | 0 631 452 | 12/1994 |
| EP | 1 113 631 | 7/2001 |

(Continued)

OTHER PUBLICATIONS

Notice of Allowance mailed on Dec. 30, 2013 in U.S. Appl. No. 12/160,931.

(Continued)

*Primary Examiner* — Amal Zenati
(74) *Attorney, Agent, or Firm* — Hartman & Citrin LLC

(57) ABSTRACT

A voicemail system (100) can include at least one processor (104) and at least one communication interface (102) operatively linked and in communication with the at least one processor (104) that is configured to receive an incoming call. The voicemail system (100) can further include at least one memory (108) operatively linked and in communication with the processor (104), wherein the at least one memory (108) is configured to store a call treatment application (112) that includes at least one rule for determining call handling treatment of the incoming call. A method (400) for operating the voicemail system (100) can include receiving (406) an address message (200) at the voicemail system (100), wherein the address message (200) identifies at least a called party number (206) of the incoming call. The method (400) can further include analyzing (406) the address message (200) to determine (408) which of a plurality of call handling treatment rules to apply, and applying (410) at least one of the call handling treatment rules.

20 Claims, 10 Drawing Sheets

(56) References Cited

U.S. PATENT DOCUMENTS

| | | | |
|---|---|---|---|
| 5,572,578 A | 11/1996 | Lin et al. | |
| 5,737,394 A | 4/1998 | Anderson et al. | |
| 5,737,395 A | 4/1998 | Irribarren | |
| 5,809,111 A | 9/1998 | Matthews | |
| 6,005,870 A * | 12/1999 | Leung et al. | 370/466 |
| 6,108,559 A | 8/2000 | Astrom et al. | |
| 6,148,212 A | 11/2000 | Park et al. | |
| 6,246,871 B1 | 6/2001 | Ala-Laurila | |
| 6,335,962 B1 | 1/2002 | Ali et al. | |
| 6,351,523 B1 | 2/2002 | Detlef | |
| 6,360,272 B1 | 3/2002 | Lincke et al. | |
| 6,480,885 B1 | 11/2002 | Olivier | |
| 6,522,727 B1 | 2/2003 | Jones | |
| 6,615,036 B1 | 9/2003 | Haas et al. | |
| 6,751,298 B2 | 6/2004 | Bhogal et al. | |
| 6,829,334 B1 | 12/2004 | Zirngibl et al. | |
| 6,868,143 B1 | 3/2005 | Menon et al. | |
| 6,879,847 B1 | 4/2005 | Kato | |
| 6,912,275 B1 * | 6/2005 | Kaplan | 379/88.2 |
| 6,937,868 B2 | 8/2005 | Himmel et al. | |
| 6,981,023 B1 | 12/2005 | Hamilton et al. | |
| 7,095,828 B1 | 8/2006 | Elliot et al. | |
| 7,142,648 B1 | 11/2006 | Miller | |
| 7,171,186 B2 | 1/2007 | Miyachi et al. | |
| 7,248,857 B1 | 7/2007 | Richardson et al. | |
| 7,277,529 B1 | 10/2007 | Wuthnow et al. | |
| 7,283,809 B1 | 10/2007 | Weinman | |
| 7,369,648 B1 | 5/2008 | Chang | |
| 7,680,491 B2 | 3/2010 | Zabawskyj et al. | |
| 7,738,833 B2 | 6/2010 | Bettis et al. | |
| 7,796,977 B2 | 9/2010 | Vander Veen | |
| 7,826,831 B2 | 11/2010 | Bettis et al. | |
| 7,894,580 B2 | 2/2011 | Veen et al. | |
| 8,320,535 B2 | 11/2012 | Alperin et al. | |
| 8,644,463 B2 | 2/2014 | Demmitt et al. | |
| 2002/0015403 A1 | 2/2002 | McConnell et al. | |
| 2002/0037075 A1 | 3/2002 | Flanagan | |
| 2002/0049768 A1 | 4/2002 | Peek et al. | |
| 2002/0077098 A1 | 6/2002 | Tilks et al. | |
| 2002/0112007 A1 | 8/2002 | Wood et al. | |
| 2002/0115429 A1 | 8/2002 | Deluca et al. | |
| 2003/0091169 A1 * | 5/2003 | Cain | 379/114.2 |
| 2003/0099341 A1 * | 5/2003 | Williams | 379/211.02 |
| 2003/0220784 A1 | 11/2003 | Fellenstein et al. | |
| 2004/0023643 A1 | 2/2004 | Vander Veen et al. | |
| 2004/0081088 A1 | 4/2004 | Schinner et al. | |
| 2004/0139471 A1 | 7/2004 | Geen et al. | |
| 2004/0146147 A1 | 7/2004 | Picard et al. | |
| 2004/0248594 A1 | 12/2004 | Wren | |
| 2004/0252679 A1 | 12/2004 | Williams et al. | |
| 2004/0264658 A1 | 12/2004 | Cline et al. | |
| 2005/0059384 A1 | 3/2005 | Kuusinen et al. | |
| 2005/0089149 A1 | 4/2005 | Elias | |
| 2005/0102368 A1 | 5/2005 | Forman et al. | |
| 2005/0113078 A1 | 5/2005 | Deitrich | |
| 2005/0186944 A1 | 8/2005 | True et al. | |
| 2005/0213715 A1 | 9/2005 | Winick | |
| 2006/0003745 A1 | 1/2006 | Gogic | |
| 2006/0025114 A1 | 2/2006 | Bales et al. | |
| 2006/0025140 A1 | 2/2006 | Bales et al. | |
| 2006/0031470 A1 | 2/2006 | Chen et al. | |
| 2006/0059361 A1 | 3/2006 | Paden | |
| 2006/0062356 A1 | 3/2006 | Vendrow | |
| 2006/0171511 A1 | 8/2006 | Liu et al. | |
| 2006/0173959 A1 | 8/2006 | McKelvie et al. | |
| 2006/0239419 A1 | 10/2006 | Joseph et al. | |
| 2006/0251222 A1 | 11/2006 | Abramson et al. | |
| 2006/0253584 A1 | 11/2006 | Dixon et al. | |
| 2006/0281443 A1 * | 12/2006 | Chen et al. | 455/413 |
| 2007/0038483 A1 | 2/2007 | Wood | |
| 2007/0066284 A1 | 3/2007 | Gatzke et al. | |
| 2007/0127632 A1 | 6/2007 | Swingle et al. | |
| 2007/0127663 A1 | 6/2007 | Bae | |
| 2007/0140443 A1 | 6/2007 | Woodring | |
| 2007/0143106 A1 | 6/2007 | Dunsmuir | |
| 2007/0173233 A1 | 7/2007 | Vander Veen et al. | |
| 2007/0180032 A1 | 8/2007 | Pearson | |
| 2007/0180504 A1 | 8/2007 | Hung | |
| 2007/0207785 A1 | 9/2007 | Chatterjee et al. | |
| 2007/0213050 A1 | 9/2007 | Jiang | |
| 2007/0223666 A1 | 9/2007 | Teague | |
| 2007/0239833 A1 | 10/2007 | Alperin et al. | |
| 2007/0287453 A1 | 12/2007 | Wang | |
| 2008/0008163 A1 | 1/2008 | Castell et al. | |
| 2008/0008299 A1 | 1/2008 | Didcock et al. | |
| 2008/0056459 A1 | 3/2008 | Vallier et al. | |
| 2008/0062246 A1 | 3/2008 | Woodworth et al. | |
| 2008/0062938 A1 | 3/2008 | Gil-soo et al. | |
| 2008/0081609 A1 | 4/2008 | Burgan et al. | |
| 2008/0140767 A1 | 6/2008 | Rao et al. | |
| 2008/0167007 A1 | 7/2008 | Novick et al. | |
| 2008/0167010 A1 | 7/2008 | Novick et al. | |
| 2008/0167014 A1 | 7/2008 | Novick et al. | |
| 2008/0188204 A1 | 8/2008 | Gavner | |
| 2008/0200152 A1 | 8/2008 | Moore | |
| 2008/0207176 A1 | 8/2008 | Brackbill et al. | |
| 2008/0243513 A1 | 10/2008 | Bucchieri et al. | |
| 2008/0260118 A1 * | 10/2008 | Lyle | 379/88.23 |
| 2008/0298459 A1 | 12/2008 | Yang et al. | |
| 2008/0300873 A1 | 12/2008 | Siminoff | |
| 2009/0149220 A1 | 6/2009 | Camilleri et al. | |
| 2009/0239507 A1 | 9/2009 | Sigmund et al. | |
| 2009/0253407 A1 | 10/2009 | Sigmund et al. | |
| 2009/0253412 A1 | 10/2009 | Sigmund et al. | |
| 2009/0253413 A1 | 10/2009 | Sigmund et al. | |
| 2010/0159886 A1 | 6/2010 | Sigmund et al. | |
| 2010/0159888 A1 | 6/2010 | Sigmund et al. | |
| 2010/0159889 A1 | 6/2010 | Sigmund et al. | |
| 2010/0159890 A1 | 6/2010 | Sigmund et al. | |
| 2010/0159891 A1 | 6/2010 | Sigmund et al. | |
| 2010/0166161 A1 | 7/2010 | Dhawan et al. | |
| 2010/0167699 A1 | 7/2010 | Sigmund et al. | |
| 2010/0189229 A1 | 7/2010 | Sigmund et al. | |
| 2010/0195807 A1 | 8/2010 | Sigmund et al. | |
| 2010/0222024 A1 | 9/2010 | Sigmund et al. | |
| 2013/0010937 A1 | 1/2013 | Sigmund et al. | |
| 2013/0012173 A1 | 1/2013 | Sigmund et al. | |
| 2013/0040614 A1 | 2/2013 | Sigmund et al. | |

FOREIGN PATENT DOCUMENTS

| | | |
|---|---|---|
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

Office Action mailed Jan. 21, 2014 in U.S. Appl. No. 13/654,480.
Office Action mailed Oct. 22, 2013 in U.S. Appl. No. 13/930,210.
U.S. Office Action dated May 22, 2012 in U.S. Appl. No. 12/485,335.
U.S. Office Action dated Apr. 24, 2012 in U.S. Appl. No. 12/160,940.
U.S. Notice of Allowance dated Jun. 21, 2012 in U.S. Appl. No. 12/161,021.
U.S. Office Action dated Jun. 6, 2012 in U.S. Appl. No. 12/161,033.

(56) References Cited

OTHER PUBLICATIONS

U.S. Notice of Allowance dated Jul. 17, 2012 in U.S. Appl. No. 12/161,076.
U.S. Office Action dated Jul. 18, 2012 in U.S. Appl. No. 12/161,035.
U.S. Notice of Allowance dated Jul. 24, 2012 in U.S. Appl. No. 12/161,033.
U.S. Office Action dated Jul. 30, 2012 in U.S. Appl. No. 12/161,027.
U.S. Office Action dated Aug. 30, 2012 in U.S. Appl. No. 12/160,931.
U.S. Notice of Allowance dated Feb. 28, 2013 in U.S. Appl. No. 12/161,064.
U.S. Office Action dated Feb. 28, 2013 in U.S. Appl. No. 13/654,480.
U.S. Appl. No. 13/751,505, filed Jan. 28, 2013 to Sigmund et al.
U.S. Appl. No. 13/785,710, filed Mar. 5, 2013 to Sigmund et al.
U.S. Notice of Allowance dated Jan. 31, 2013 in U.S. Appl. No. 12/485,961.
U.S. Notice of Allowance dated Dec. 27, 2012 in U.S. Appl. No. 13/616,198.
U.S. Notice of Allowance dated May 26, 2011 in U.S. Appl. No. 12/201,945.
U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.
U.S. Official Action dated Apr. 27, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 26, 2012 in U.S. Appl. No. 12/160,946.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
Office Action mailed on Aug. 16, 2013 in U.S. Appl. No. 13/654,480.
Office Action mailed on Jun. 4, 2013 in U.S. Appl. No. 13/785,710.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Sep. 14, 2012 in U.S. Appl. No. 12/161,064.
U.S. Notice of Allowance dated Nov. 21, 2012 in U.S. Appl. No. 12/477,971.
U.S. Notice of Allowance dated Nov. 23, 2012 in U.S. Appl. No. 12/485,335.
U.S. Notice of Allowance dated Oct. 25, 2012 in U.S. Appl. No. 12/160,940.
U.S. Office Action dated Oct. 11, 2012 in U.S. Appl. No. 12/160,946.
U.S. Notice of Allowance dated Nov. 16, 2012 in U.S. Appl. No. 12/161,027.
Office Action mailed Jun. 18, 2014 in U.S. Appl. No. 13/613,525.

\* cited by examiner

| Rule | TG | Sub | Direct Call | Calling A | Original Called B | Called C | Redirecting D | Call Nature | Scan | Calling Number |
|---|---|---|---|---|---|---|---|---|---|---|
| 1 | X | X | X | – | – | DPN | P | F | D | A |
| 2 | X | X | X | – | – | DPN | – | D | A | A |
| 3 | X | X | X | – | P | DPN | – | F | B | A |
| 4 | X | X | X | P | – | DPN | – | F | C | A |
| 5 | X | T | T | P | – | RPN | – | D | A | A |
| 6 | X | X | X | – | – | P | – | F | C | A |

FIG. 3A

| Row | Call Nature | Number In | Number Out |
|---|---|---|---|
| 1 | D | * | * |
| 2 | F | * | * |

FIG. 3B

CALL HANDLING TREATMENT FOR VOICEMAIL SYSTEMS

TECHNICAL FIELD

The present disclosure relates generally to voicemail systems. More particularly, the present disclosure relates to call handling treatment for voicemail systems.

BACKGROUND

Voicemail is a popular telephone service feature, and is often included in the price paid for telephone service. When a called line with voicemail functionality does not answer or is busy, a call can be handled by a voicemail system. A voicemail system can store recordings and/or announcements for a user. When a call is passed to a voicemail system, the voicemail system can play one or more recordings and/or announcements for the calling party, or a generic message, and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message and/or data and associated call data.

SUMMARY

According to one aspect of the present disclosure, a voicemail system can include one or more processors and one or more communication interfaces that are operatively linked and in communication with the one or more processors. The one or more communication interfaces can be configured to receive an incoming call. The voicemail system can further include one or more memory operatively linked and in communication with the processor. The one or more memory can be configured to store a call treatment application that includes one or more rules for determining call handling treatment of the incoming call.

In some embodiments, the one or more communication interfaces can be further configured to receive an address message. The address message can identify a called party number of the incoming call. In some embodiments, the address message can identify one or more of a calling party number, an original called number, and a redirecting number.

In one embodiment, the one or more rules can determine that only the called party number is present and can instruct the voicemail system to forward the incoming call to an open tree voicemail greeting. The open tree voicemail greeting can request a calling party to enter a voicemail box number for the voicemail box that the calling party would like to access. In some embodiments, the one or more rules can prevent the incoming call from being routed to a calling party voicemail box.

In other embodiments, the one or more rules determine that the redirecting number is present and instruct the voicemail system to forward the incoming call to the redirecting number.

In other embodiments, the one or more rules determine that the calling party number and the original called number are equal and instruct the voicemail system to route the incoming call to a calling party voicemail box such that the calling party can retrieve voicemail messages.

In other embodiments, the one or more rules determine that the original called number is present and instruct the voicemail system to forward the incoming call to a voicemail box associated with the original called number.

In other embodiments, the one or more rules determine that a calling party mailbox and a called party mailbox are resident on the voicemail system and that the calling party number is present. The one or more rules instruct the voicemail system to route the incoming call to the calling party mailbox without requiring the calling party to re-enter the calling party number.

In another embodiment, the one or more rules determine that the calling party number is present and instruct the voicemail system to route the incoming call to a voicemail box associated with the called party number.

According to another aspect of the present disclosure, a method for operating a voicemail system to determine call handling treatment of an incoming call includes receiving an address message at the voicemail system. The address message can identify a called party number of the incoming call. The method can further include analyzing the address message to determine what call handling treatment rules to apply and apply the call handling treatment rules. The address message can further identify one or more of a calling party number, an original called number, and a redirecting number.

In some embodiments, analyzing the address message to determine what call handling treatment rules to apply can include determining that only the called party number is present, and determining to apply a first rule, whereby a calling party is requested to enter a voicemail box number for the voicemail box the calling party would like to access. In some embodiments, applying one or more call handling treatment rules can include applying the first rule.

In other embodiments, analyzing the address message to determine what call handling treatment rules to apply can include determining that the calling party number and the original called number are equal, and determining to apply a second rule, whereby the incoming call is routed to a calling party voicemail box such that the calling party can retrieve voicemail messages. In some embodiments, applying one or more call handling treatment rules can include applying the second rule.

In other embodiments, analyzing the address message to determine what call handling treatment rules to apply can include determining that the redirecting number is present, and determining to apply a third rule, whereby the incoming call is forwarded to the redirect number. In some embodiments, applying one or more call handling treatment rules can include applying the third rule.

In other embodiments, analyzing the address message to determine what call handling treatment rules to apply can include determining that the original called number is present, and determining to apply a fourth rule, whereby the incoming call is forwarded to a voicemail box associated with the original called number. In some embodiments, applying one or more call handling treatment rules can include applying the fourth rule.

In other embodiments, analyzing the address message to determine what call handling treatment rules to apply can include determining that the calling party number is present, and determining to apply a fifth rule, whereby the incoming call is routed to a voicemail box associated with the called party number. In some embodiments, applying one or more of the plurality of call handling treatment rules can include applying the fifth rule.

In other embodiments, analyzing the address message to determine what call handling treatment rules to apply can include determining that the calling party number is present, and determining to apply a sixth rule, whereby the incoming call is routed to a voicemail box associated with the calling party number without requiring the calling party to renter the calling party number. In some embodiments, applying one or more call handling treatment rules can include applying the sixth rule.

According to another aspect of the present disclosure, a method for operating a voicemail system can include receiving a call at the voicemail system from an internationally roaming voicemail user to retrieve voicemail messages. The call identifies a voicemail box number. The method can further include determining that the voicemail box number is proper for the voicemail user and routing the call to a voicemail box associated with the user.

In some embodiments, routing the call to the voicemail box number can include routing the call to the voicemail box number without prompting the voicemail user to reenter the voicemail box number.

According to another aspect of the present disclosure, a method for operating a voicemail system can include receiving a call at the voicemail system and determining to route the call to an open tree voicemail greeting. The open tree voicemail greeting can request the calling party to enter a voicemail box number for the voicemail box that the calling party would like to access. In some embodiments, the method can further include routing the call to the voicemail box number identified by the calling party.

BRIEF DESCRIPTION OF THE DRAWINGS

FIG. 3A schematically illustrates a call nature table, according to an exemplary embodiment of the present disclosure.

FIG. 3B schematically illustrates a translation table, according to an exemplary embodiment of the present disclosure.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
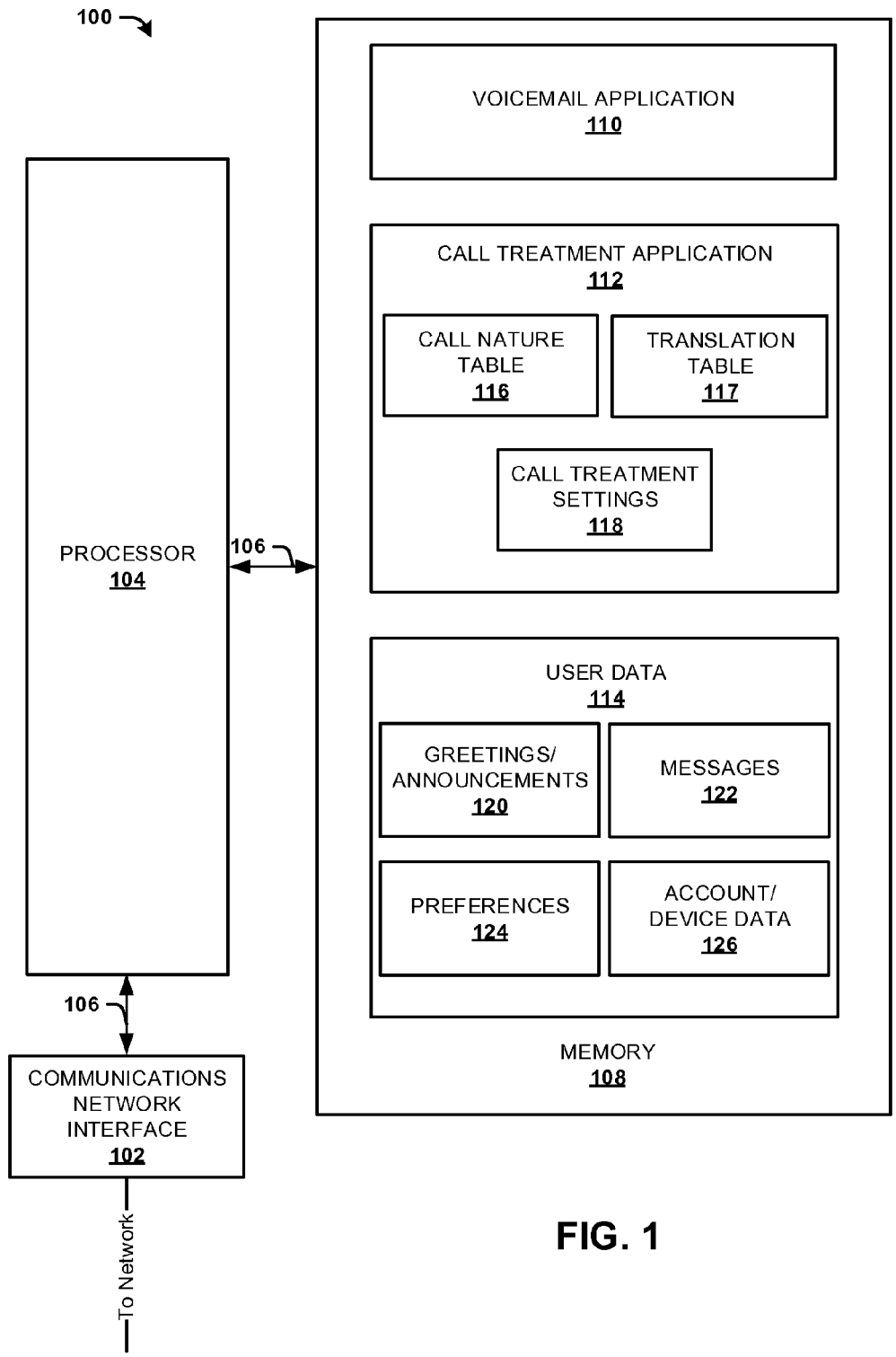
FIG. 1 schematically illustrates a voicemail system, according to an exemplary embodiment of the present disclosure.

Referring now to the drawings wherein like numerals represent like elements throughout the several views, FIG. 1 schematically illustrates a voicemail system (VMS) 100 according to an exemplary embodiment of the present disclosure. The illustrated VMS 100 includes a communications network interface 102 that is operatively linked and in communication with a processor 104 via a data/memory bus 106. The communications network interface 102 allows communication between one or more components of a communications network (not shown). The illustrated processor 104 is operatively linked and in communication with a memory 108 via a data/memory bus 106.

The communications network, with which the communications network interface 102 allows communications, can be a circuit-switched network, such as a PSTN (Public Switched Telephone Network), a packet-switched network, such as the Internet, or a wireless communications network, for example. By way of example, a wireless communications network can be configured as a 2G GSM (Global System for Mobile communications) network and can provide data communications via GPRS (General Packet Radio Service), and EDGE (Enhanced Data rates for GSM Evolution). By way of further example, the wireless communications network can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network is also compatible with future mobile communications standards including, but not limited to, pre-4G and 4G standards, for example. Moreover, the wireless communications network can be configured for providing messaging services via Short Message Service (SMS), Multimedia Message Service (MMS), instant messaging, and voicemail messaging including plain old voicemail (POVM) and visual voicemail (WM).

The word "memory", as used herein to describe the memory 108, collectively refers to all memory types associated with the VMS 100, such as, but not limited to, processor registers, processor caches, random access memory (RAM), other volatile memory forms, and non-volatile, semi-permanent or permanent memory types; for example, tape-based media, optical media, solid state media, hard disks, combinations thereof, and the like. While the memory 108 is illustrated as residing proximate the processor 104, it should be understood that the memory 108 can be a remotely accessed storage system, for example, a remote disk, a removable storage medium, combinations thereof, and the like. Moreover, the memory 108 is intended to encompass network memory and/or other storage devices, in wired or wireless communication with the VMS 100, which may utilize the communications network interface 102 to facilitate such communication. Thus, any of the data, applications, tables, settings, preferences, messages, and/or software described below can be stored in the memory 108 and/or accessed via network connections to other data processing systems (not shown). Accordingly, the present disclosure may operate on the VMS 100, wherein the VMS 100 is configured as a server to one or more client data processing systems as dictated by a client/server model.

The illustrated memory 108 includes one or more VMAs (voicemail applications) 110 and one or more CTAs (call treatment applications) 112. Additionally, the memory 108 can include other data, software, instructions, applications, and the like, for example, an operating system (not illustrated), hardware data, firmware, and the like. Although the VMA 110 and the CTA 112 are shown as separate entities, it should be appreciated that substantially all of the functionality of the VMS 100 modules can be performed by a single application. The memory 108 can also include user data 114.

The VMA 110 can provide user interface functions for called parties to retrieve and listen to voicemail messages, save voicemail messages, delete voicemail message, prioritize voicemail messages, change voicemail greetings, change voicemail announcements, change voicemail preferences and settings, and otherwise manage at least one voicemail box. The aforementioned interface functions can be provided via a TUI (Telephone User Interface) whereby a user can access their voicemail box by calling the VMS 100. Alternatively, the interface functions can be provided by a GUI (Graphical User Interface) of a visual voicemail application stored on the user's device. Other user interfaces, such as a web interface, are contemplated. The VMA 110 can also provide user interface functions for calling parties to leave voicemail messages for a called party. The VMA 110 can also be configured to manage the user data 114.

The illustrated CTA 112 includes one or more CNTs (Call Nature Tables) 116, one or more translation tables 117, and call treatment settings 118. The CNT 116 can include data and instructions that define at least one rule for call handling treatment for all domestic call scenarios. The CNT 116 can further include data and instructions that define at least one rule for call handling treatment of international call scenarios. For example, a rule for call handling treatment can be defined to allow a user roaming internationally to retrieve voicemail messages without being required to reenter his or her voicemail box number. The CNT 116 can further define rules to eliminate a present deposit routing fault to an internationally roaming number when the calling party has a voicemail box on the same voicemail system as the target voicemail box. The CNT 116 and the translation table 117 are described in more detail with reference to FIG. 3A and FIG. 3B, respectively.

The call treatment settings 118 can include a call nature setting that can be set to "ON" to activate the CNT 116 and can be set to "OFF" to ignore the CNT 116. Embodiments of the present disclosure are described with the assumption that the call nature setting is set to "ON," rendering the CNT 116 in an active state. The call treatment settings 118 can further include a double forwarding setting. The double forwarding setting can allow additional information to be used if a parameter in the CNT 116 is not available, for example. The double forwarding setting can be set to "ON" to activate double forwarding and can be set to "OFF" to disable double forwarding. Embodiments of the present disclosure are described with the assumption that the double forwarding setting is set to "OFF".

The user data 114 can include various data types. For purposes of illustration and not limitation, the user data 114 is illustrated in FIG. 1, and described herein, as including a number of categories of data that can be associated with one or more users and/or one or more voicemail boxes of the VMS 100. Exemplary categories of user data 114 can include, for example, greetings and/or announcements 120, messages 122, user preferences 124, account/device data 126, and other data (not illustrated). The user data 114 can include one or more voicemail boxes associated with one or more users. The user data 114 can be configured, stored, synced, updated, and deleted by any number of users, network operators, or other authorized parties. It will be appreciated that greetings 120, messages 122, preferences 124, and account/device data 126 can be updated by a user of the VMS 100 or by any other authorized party. The messages 122 can be updated and stored by the VMS 100, for example, when a calling party leaves a message for the user.

The greetings and/or announcements 120 can include greetings, announcements, schedules, and the like, and can be associated with a user and one or more voicemail boxes. The greetings 120 can be configured by the user, by a network node, by the VMS 100, or by any other authorized party or device. For example, a user can record a greeting, schedule, or announcement, and store the greeting 120 on the VMS 100. As such, the greetings 100 can be audio data that is stored in the VMS memory 108 as an audio file. Additionally, the greetings 120 can be default messages that are created by the network, or a network node, and can be tailored for a user.

The greetings 120 can be stored in any desired format. If the greetings 120 are stored as audio data, exemplary formats include, but are not limited to, WAV (waveform audio), AIFF (audio interchange file format), RAW, encoded in GSM CODEC, AAC (advanced audio coding), MP3 (MPEG-1 audio layer 3), MP4 (MPEG-4 Part 14), WMA (Windows®  media audio), RA (RealAudio), FLAC (free lossless audio codec), ALE (Apple® lossless encoder), ALAC (Apple® lossless audio codec), and other open and proprietary audio formats.

The preferences 124 can include data relating to a user's preferences for at least one voicemail box. The preferences 124 can include, for example, an indication as to what functions the user wants to make available to calling parties, conversion formats supported by the user's device, forwarding destination information, e.g., telephone numbers, email addresses, facsimile numbers, and the like, message time limits, voice to text settings, the number of rings allowed prior to passing a call to the VMS 100, message waiting indicator preferences, download settings, data routing preferences, and the like. It will be understood that users can customize many other functions and options of the VMS 100 including, but not limited to, options for bypassing the VMS 100 and sending incoming calls for a user to another system, phone number, and/or user, forwarding numbers, voice or data delivery options, including formats, size, delivery times, email addresses, and the like, as well as other preferences.

The messages 122 can include audio files created by recordings made by the VMS 100, text created by a calling party or by the VMS 100, headers associated with audio or text, and the like. For example, if a calling party leaves a spoken message for a called party, an audio file associated with a message 122 can be created by recording the spoken message. The audio files, if any, can be stored in any desired format, including, but not limited to, WAV, AIFF, RAW, encoded in GSM CODEC, AAC, MP3, MP4, WMA, RA, FLAC, ALE, ALAC, and other open and proprietary audio formats. Text data of the message 122 can include text created by the VMS 100, for example, using a speech to text converter. The text data can also include text created by or entered by the calling party, for example, an alphanumeric message, a callback number, a text message, and the like. The headers of the message 122 can include call data, such as the MSISDN, the length of the message, the size of the text file, if applicable, the time and date of the call, priority information, and the like. In addition to the file formats discussed above, the audio files, headers, and text can be stored in any network-recognizable format. The various data associated with a message 122 can be stored by the VMS 100 in any manner. If desired, the various data can be correlated to associate an audio file, a text file, and headers with each other as part of a message 122.

Account/device data 126 can include data relating to the user's account and/or device including, but not limited to, the user's subscription plan and the user's device capabilities. For example, the VMS 100 can be in communication with one or more billing platforms, subscriber databases, other network nodes, and the like to receive the account/device data 126 relating to a user's subscription plan, usage, and billing information. Additionally, the account/device data 126 can inform the VMS 100 of the features the user's device supports by indicating the IMEI (International Mobile Equipment Identity), serial number, carrier, software version(s), firmware, carrier-specific applications, combinations thereof, or the like. The account/device data 126 can pass-through the VMS 100 or can be stored at least temporarily in the memory 108. The VMS 100 can use the account/device data 126 to determine file formats and functionality that should be provided to a calling party or a user based upon billing, device, network, or other considerations. Additionally, billing considerations can be used to tailor options presented to a calling party. A user can be given the ability to override deactivation of any desired features or functionality.

Figure 2:
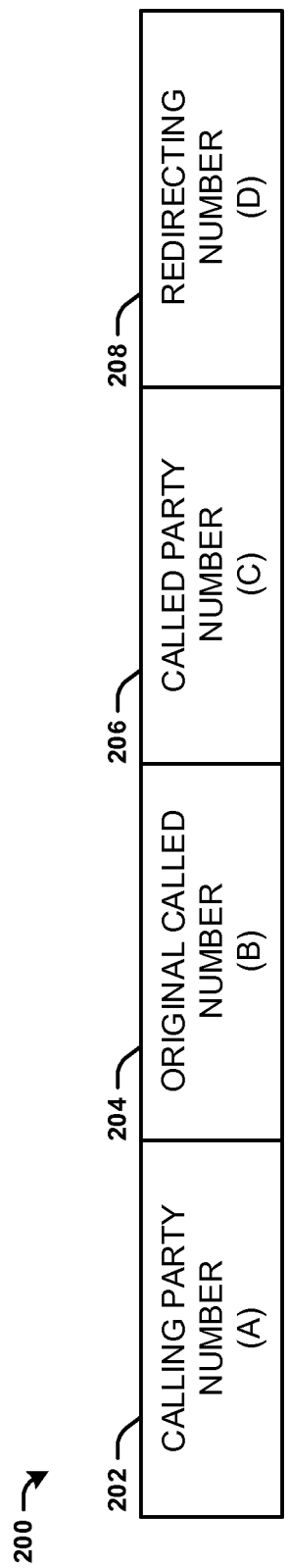
FIG. 2 schematically illustrates at least a portion of an initial address message, according to an exemplary embodiment of the present disclosure.

Referring now to FIG. 2, a portion of an IAM (Initial Address Message) 200 is illustrated, according to an embodiment of the present disclosure. The IAM 200 can be an ISUP (Integrated Services Digital Network User Part) message as defined by the ISUP protocol, which is part of the SS7 (Signaling System Number 7) protocol suite. The ISUP IAM message can be based upon the ISUP specification as specified by the ITU-T (International Telecommunication Union Telecommunication Standardization Sector) as part of the Q.76x series, the ANSI (American National Standards Institute), and the Telcordia GR-246 series, for example. It should be understood that improvements, evolutions, variations, and revisions of the ISUP protocol are contemplated as are alternative protocols that provide like or similar functionality.

The illustrated IAM message 200 includes four fields that can be used by the CNT 116 to determine the appropriate rule for call handling treatment of a given call scenario. For the sake of brevity and clarity the illustrated IAM message 200 does not include some fields and parameters.

The illustrated IAM message 200 includes a calling party number field 202 (hereinafter field A 202), an original called number field 204 (hereinafter field B 204), a called party number field 206 (hereinafter field C 206), and a redirecting number field 208 (hereinafter field D 208). The calling party number in field A 202 is the number of the calling party and can be set as either "network provided" or "customer provided" based upon where the call originates. The original called number in field B 204 identifies the number originally called by the calling party and can be specified for call forwarding scenarios. The called party number in field C 206 is the number of the called party. The original called number can be forwarded to the called party number, for example. The redirecting number in field D 208 is used in some scenarios of call forwarding to redirect a call to another voicemail box identified by the redirecting number present in field D 208.

According to present ISUP protocol specifications, field C 206 is the only mandatory field and the other fields can be populated as needed. When a call is placed, the originating SSP (service switching point) transmits an ISUP IAM message, such as IAM message 200, to reserve a path from the originating switch to the destination switch. The destination switch rings the called party and after a predetermined number of rings the call is transferred to the VMS 100. The IAM message 200 is received by the VMS 100 and analyzed by comparing the IAM message fields 202, 204, 206, 208 to the fields of the CNT 116 to determine at least one rule to apply as defined by the CNT 116, described immediately below with reference to FIG. 3A.

Referring now to FIG. 3A, a CNT 116 is illustrated, according to an exemplary embodiment of the present disclosure. The illustrated CNT 116 includes a rule field 300, a trunk group field 302, a subscriber field 304, a direct call field 306, a calling party number field 308, an original called number field 310, a called party number field 312, a redirecting number field 314, a call nature field 316, a scan field 318, and a calling number field 320. Each field is populated with a character, such as, "X", "–", "=", "P", "T", "DPN", "RPN", "A", "B", "C", "D", or "F", for example. It should be understood that these characters are merely exemplary and can be changed, modified, or otherwise customized by the voicemail service provider. Each character is now briefly described.

In the illustrated example, an "X" is used to indicate that a field should be ignored for the corresponding rule. An "X" can be used in the trunk group field 302, the subscriber field 304, and the direct call field 306, although this is not necessarily the case.

In the illustrated example, a "–" is used to indicate that the contents of a field does not bear any result for the corresponding rule and therefore the VMS 100 does not care what number is populated in the field. A "–" can be used in the calling party number field 308, the original called number field 310, and the redirecting number field 314, although this is not necessarily the case.

In the illustrated example, an "=" is used to indicate that a field and any other field with an "=" are checked for equality. An "=" can be used in the calling number field 308 and the original called field 310, although this is not necessarily the case.

In the illustrated example, a "P" is used to indicate that a field is populated with any value. A "P" can be used in the calling party number field 308, the original called number field 310, the called party number field 312, or the redirecting number field 314, although this is not necessarily the case.

In the illustrated example, a "T" is used to indicate that the calling party number in the calling party number field 308 must be associated with at least one voicemail box in the VMS 100 prior to applying this rule. An "F" in this field (not shown) can indicate that the calling party number is not associated with at least one voicemail box.

In the illustrated example, a "DPN" indicates that the number is a deposit pilot number. An "RPN" indicates that the number is a retrieval pilot number. A pilot number is a special number assigned to a destination that allows switch data translation rules to be developed to route a call to the specified destination. In the case of voicemail, different pilot numbers are used to route calls to the proper voicemail system. A "DPN" and "RPN" are used in the called party number field 312, although this is not necessarily the case.

In the illustrated example, an "F" in the call nature field 316 indicates that a call should be routed such that the calling party can deposit a voicemail message at the designated voicemail box. A "D" character indicates that a call should be routed to a voicemail box for message retrieval. Generally, a "D" character indicates that a calling party has called to listen to any available voicemail messages that have been deposited into his or her voicemail box. The "F" and "D" characters can be used in the call nature field 316, although this is not necessarily the case.

In the illustrated example, the scan field 318 and the calling number field 320 can be populated with an "A," "B," "C," or "D" to identify the field from which the scan field 318 and/or the calling number field 320 should be populated, although this is not necessarily the case.

The rule field 300 identifies each row as a rule of the CNT 116. The rule field 300 includes a number representation of the rule number or row of the CNT 116.

The trunk group field 302 can include a value that can be used by the CNT 116 to specify the trunk group to which each rule can be applied. In the illustrated example, the trunk group field 302 is ignored for all rules as indicated by the "X" character.

The subscriber field 304 can be used to examine the calling party number field 202 of the IAM message 200, and to provide call handling treatment based upon the result. In the illustrated example, an "X" is used for rule one through rule four and rule six, and a "T" is used for rule five. The "X" is used to designate that this field is ignored for rule one through rule four and rule six. The "T" is used to designate that the calling party number in the calling party number field 308 must be associated with at least one voicemail box in the VMS 100 prior to applying this rule. An "F" in this field (not shown) can indicate that the calling party number in the calling party number field 308 is not associated with at least one voicemail box. The direct call field 306 can similarly include either an "X" or a "T." As illustrated, the direct call field 306 includes an "X" for rule one through rule four and rule six and a "T" for rule five.

The calling party number field 308 can correspond to field A 202 of the IAM message 200. In the illustrated example, a "–" is used for rule one, rule three, and rule six to indicate that the VMS 100 does not consider what is populated in the field. With regard to rule two, the calling party number field 308, field A 202 and the original called number field 310, field B 204 are equal indicating that a user has called his or her own number to access a voicemail box, for example. A "P" character is used for rule four and rule five to indicate that the field is populated with any value.

The original called number field 310 can correspond to field B 204. In the illustrated example, the "–" character is used for rule one and rule four through rule six. The "=" character is used for rule two, and the "P" character is used for rule four through rule six.

The called party number field 312 can correspond to field C 206. In the illustrated example, a DPN is present for rule one through rule four, an RPN is present for rule five, and a "P" character is present for rule six.

The redirecting number field 314 can correspond to field D 208. The redirecting number field 314 can include a "–" character to indicate that the field is ignored or a "P" character to indicate a value is present. In the illustrated example, a "P" character is present for rule one and "–" characters are present for all other rules.

The call nature field 316 can include a setting to control call treatment. An "F" character indicates that a call should be routed such that the calling party can deposit a voicemail message at the designated voicemail box. A "D" character indicates that a call should be routed to a voicemail box for message retrieval. Generally, a "D" character indicates that a voicemail user has called to listen to any available voicemail messages. In the illustrated example, an "F" character is present for rule one, rule three, rule four, and rule six, and a "D" character is present for rule two and rule five.

The scan field 318 can include a setting for each rule to specify the field 308, 310, 312, 314 in the IAM message 200 to be used as the voicemail box number, where each IAM message 200 field corresponds to the calling party number field 308 (field A 202), the original called number field 310 (field B 204), the called party number field 312 (field C 206), and the redirecting number field 314 (field D 208). For example, rule one specifies field D 208, which is the redirecting number field 314 in the CNT 116, to be scanned for the voicemail box number to which an inbound call should be forwarded or routed. Since many call scenarios are a first mobile device calling a second mobile device, this setting determines the number to select the proper mailbox on the VMS 100.

The calling number field 320 can include a setting that provides information to the VMS 100 to record the number of the calling party. This allows the called party to "check" the calling party number from which a voicemail message was deposited.

Referring now to FIG. 3B, a translation table 117 is illustrated, according to an embodiment of the present disclosure. The translation table 117 allows the manipulation of data that is passed in the scan field 318. In the preceding exemplary embodiments, the numbers can be ten digit numbers so the number present in the number-in field 322 is passed to the number-out field 324 without any change. If the numbers were being passed as eleven digit numbers, for example, the translation table 117 could remove the leading "1" or other digits before attempting to locate the corresponding ten digit mailbox number.

Figure 4:
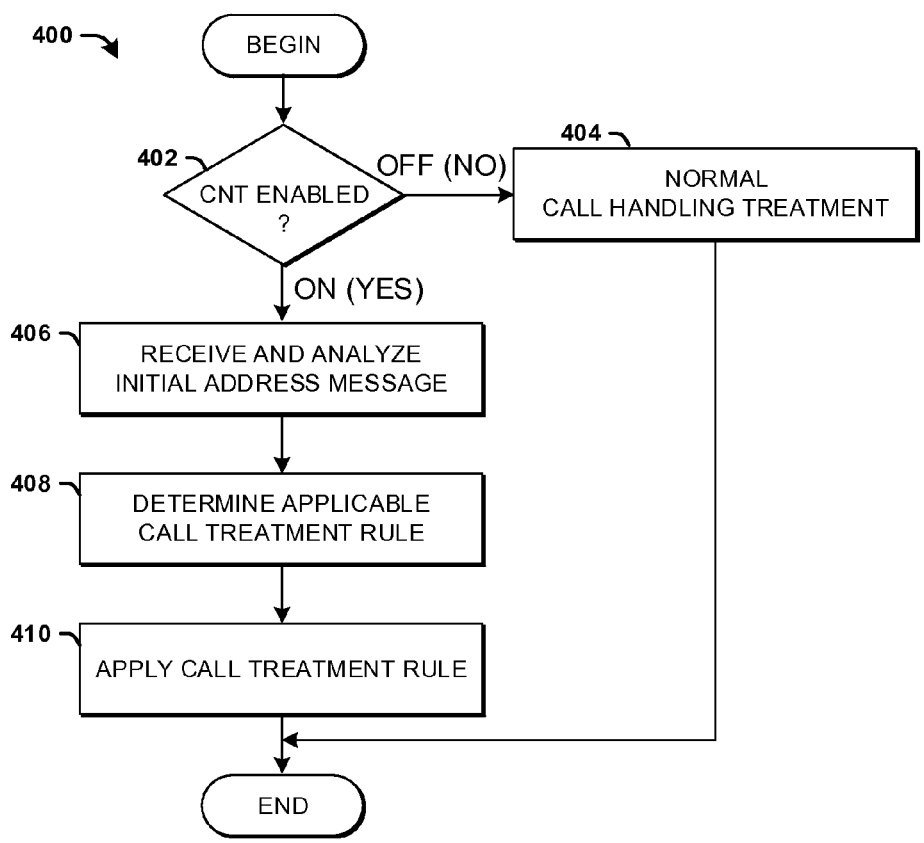
FIG. 4 schematically illustrates a method for call handling treatment, according to an exemplary embodiment of the present disclosure.

Referring now to FIG. 4, a method 400 for call handling treatment is illustrated, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

The illustrated method 400 begins and flow proceeds to determination block 402 wherein it is determined if the CNT 116 is activated based upon the call treatment settings 118, particularly the call nature setting. If the call nature setting is set to "OFF," the CNT 116 is disabled and flow proceeds to block 404 wherein call handling treatment proceeds in accordance with established rules and procedures for normal call treatment. Otherwise, flow proceeds to block 406 and the IAM message 200 is analyzed by comparing the received parameters of the IAM message 200 to the CNT 116 to determine, at block 408, the call treatment rule that should be applied. At block 410, the applicable call treatment rule is applied and the inbound call is handled accordingly. The method 400 can end.

The methods 500, 600, 700, 800, 900, 1000 illustrated in FIGS. 5-10 and the description thereof provided immediately below can be considered the application of rule one through rule six of the exemplary CNT 116 illustrated in FIG. 3A, respectively, as identified in block 410.

Figure 5:
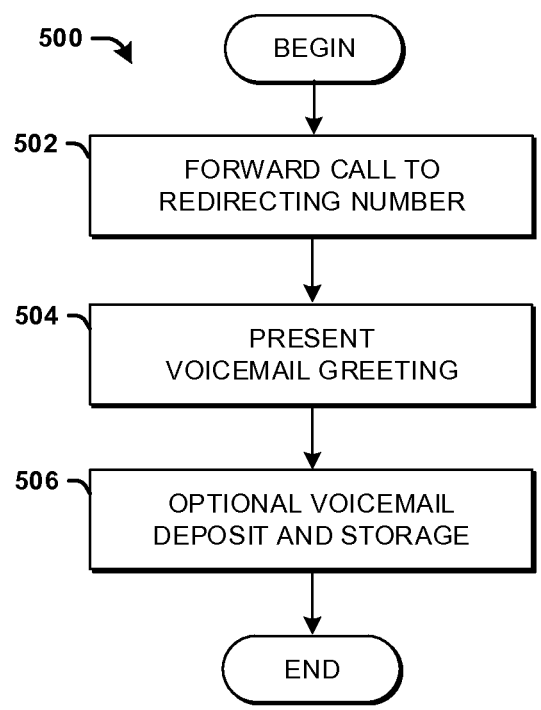
FIG. 5 schematically illustrates a method for call handling treatment, according to another exemplary embodiment of the present disclosure.

Referring now to FIG. 5, a method for call handling treatment as defined by the exemplary rule one of FIG. 3A is illustrated, according to an exemplary embodiment of the present disclosure. The method 500 is described below with reference to the CNT 116 as illustrated in FIG. 3A.

It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

Turning now to both FIG. 3A and FIG. 5, the redirecting number field 314 is populated, as indicated by the "P," and the call nature, as indicated by the "F," is to route the call to the mailbox greeting. The scan field 318 indicates the redirecting number field 314 is to be scanned for the mailbox number. Accordingly, as illustrated in block 502, the call is forwarded to the mailbox number provided in the redirecting number field 314. The VMS 100 can present the voicemail greeting associated with the called voicemail box, if any, at block 504. The calling party can dictate a message and the message can be stored, for example, in the messages 122 of the memory 108, as illustrated at block 506. The method 500 can end.

Figure 6:
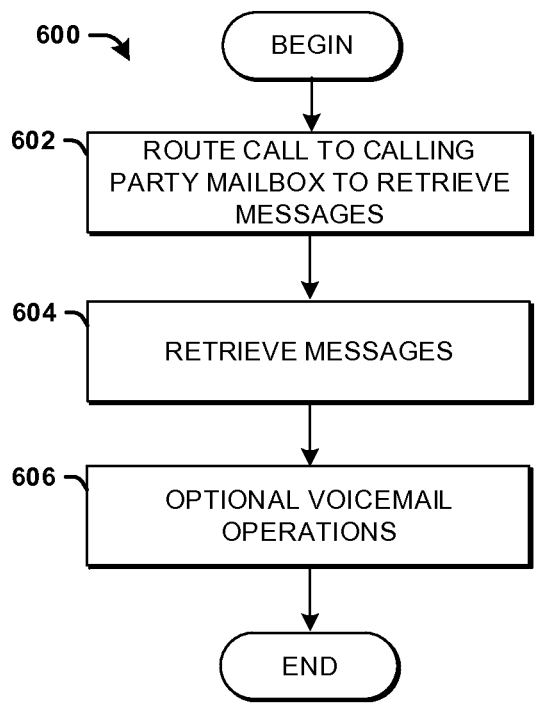
FIG. 6 schematically illustrates a method for call handling treatment, according to yet another exemplary embodiment of the present disclosure.

Referring now to FIG. 6, a method 600 for call handling treatment as defined by rule two is illustrated, according to an exemplary embodiment of the present disclosure. The method 600 is described below with reference to the CNT 116 as illustrated in FIG. 3A.

It should be understood that the steps of the method 600 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time. Some or all steps of this process, and/or substantially equivalent steps, can be performed by execution of computer-readable instructions included on a computer readable medium.

Turning now to both FIG. 3A and FIG. 6, the calling party number 202, 308 and the original called number 204, 310 are equal. Generally, the calling party number 202, 308 and the original called number 204, 310 are equal if the calling party number originates from the device assigned with the same number (MSISDN). The call nature for rule two is designated as "D" to route calls to the calling party's voicemail box to retrieve voicemail messages. The scan field 318 indicates the calling party number field 308 is to be scanned for the mailbox number. Accordingly, as illustrated in block 602, the call is routed to the mailbox number provided in the calling party number field 308. At block 604, the calling party can retrieve voicemail messages. The calling party can engage other voicemail operations, such as, but not limited to, listening to messages, saving messages, prioritizing messages, and deleting messages, as illustrated in block 606. The method 600 can end.

Figure 7:
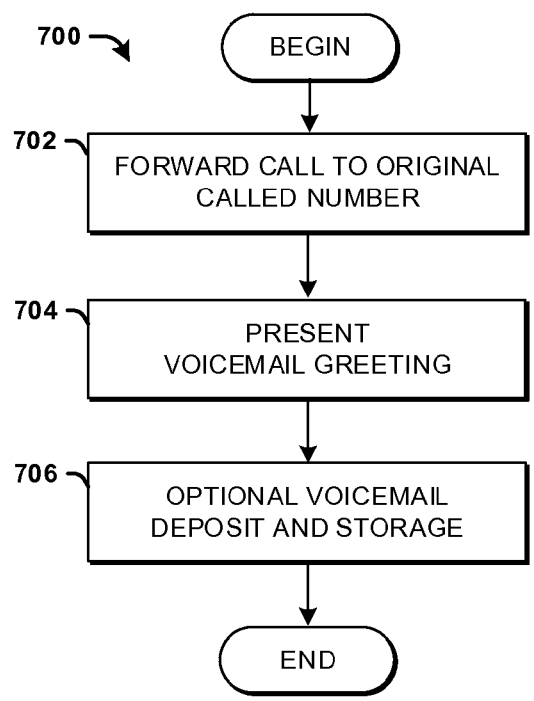
FIG. 7 schematically illustrates a method for call handling treatment, according to still another exemplary embodiment of the present disclosure.

Referring now to FIG. 7, a method 700 for call handling treatment as defined by rule three is illustrated, according to an exemplary embodiment of the present disclosure. The method 700 is described below with reference to the CNT 116 as illustrated in FIG. 3A.

It should be understood that the steps of the method 700 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 700 can be ended at any time. Some or all steps of this process, and/or substantially equivalent steps, can be performed by execution of computer-readable instructions included on a computer readable medium.

Turning now to both FIG. 3A and FIG. 7, the original called number field 310 is populated and the call nature is designated as "F" to route calls to the mailbox greeting for the called party. The scan field 318 indicates the original called number 310 is to be scanned for the mailbox number. Accordingly, as illustrated in block 702, the call is routed to the mailbox number provided in the original called number field 310. The VMS 100 can present the voicemail greeting associated with the called voicemail box, if any, at block 704. The calling party can dictate a message and the message can be stored, for example, in the messages 122 of the memory 108, as illustrated at block 706. The method 700 can end.

Figure 8:
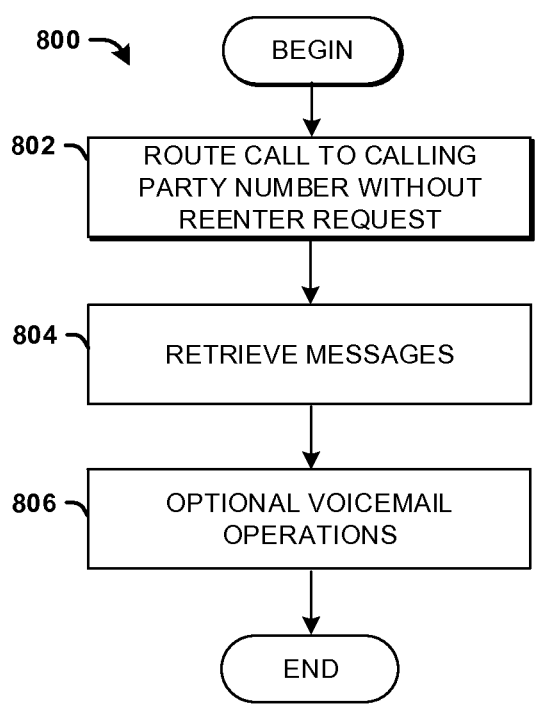
FIG. 8 schematically illustrates a method for call handling treatment, according to another exemplary embodiment of the present disclosure.

Referring now to FIG. 8, a method 800 for call handling treatment as defined by rule four is illustrated, according to an exemplary embodiment of the present disclosure. Generally, rule four is used to circumvent an international calling number issue that presently requires the calling party to re-enter the ten digit number that was dialed. The method 800 is described below with reference to the CNT 116 as illustrated in FIG. 3A.

It should be understood that the steps of the method 800 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 800 can be ended at any time. Some or all steps of this process, and/or substantially equivalent steps, can be performed by execution of computer-readable instructions included on a computer readable medium.

Turning now to both FIG. 3A and FIG. 8, the calling party number field 308 is populated and the call nature is designated as "F" to route calls to the mailbox greeting for the called party. The scan field 318 indicates the called party number field 312 is to be scanned for the mailbox number. Accordingly, as illustrated in block 802, the call is routed to the mailbox number provided in the calling party number field 308 without having the calling party reenter the voicemail box number. At block 804, the calling party can retrieve voicemail messages. The calling party can engage other voicemail operations, such as, but not limited to, listening to messages, saving messages, prioritizing messages, and deleting messages, as illustrated in block 806. The method 800 can end.

Figure 9:
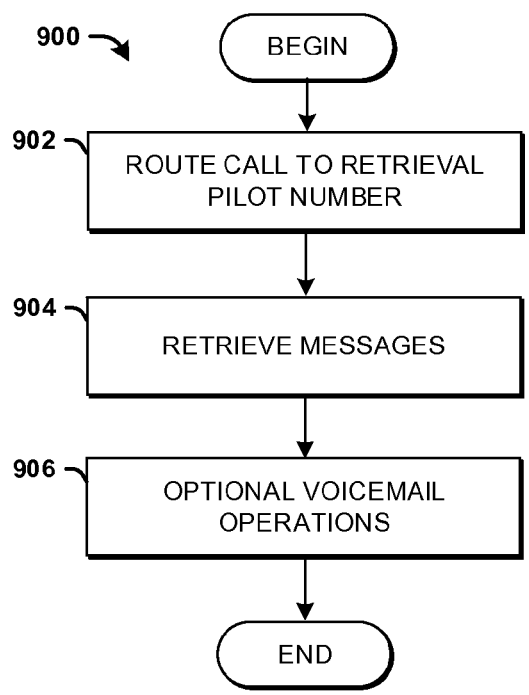
FIG. 9 schematically illustrates a method for call handling treatment, according to yet another exemplary embodiment of the present disclosure.

Referring now to FIG. 9, a method 900 for call handling treatment as defined by rule five is illustrated, according to an exemplary embodiment of the present disclosure. Generally, rule five corresponds to the normal path. The method 900 is described below with reference to the CNT 116 as illustrated in FIG. 3A.

It should be understood that the steps of the method 900 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 900 can be ended at any time. Some or all steps of this process, and/or substantially equivalent steps, can be performed by execution of computer-readable instructions included on a computer readable medium.

Turning now to both FIG. 3A and FIG. 9, the calling party number field 308 is populated and the call nature is designated as "D" to route calls to the calling party's voicemail box to retrieve voicemail messages. The scan field 318 indicates the calling party number field 308 is to be scanned for the mailbox number. Accordingly, as illustrated in block 902, the call is routed to the mailbox number provided in the calling party number field 308. At block 904, the calling party can retrieve voicemail messages. The calling party can engage other voicemail operations, such as, but not limited to, listening to messages, saving messages, prioritizing messages, and deleting messages, as illustrated in block 906. The method 900 can end.

Figure 10:
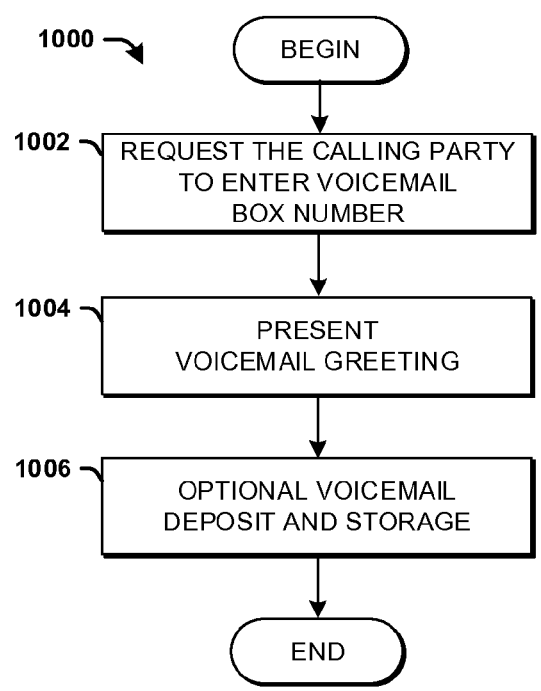
FIG. 10 schematically illustrates a method for call handling treatment, according to still another exemplary embodiment of the present disclosure.

Referring now to FIG. 10, a method 1000 for call handling treatment as defined by rule two is illustrated, according to an exemplary embodiment of the present disclosure. The method 1000 is described below with reference to the CNT 116 as illustrated in FIG. 3A.

It should be understood that the steps of the method 1000 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 1000 can be ended at any time. Some or all steps of this process, and/or substantially equivalent steps, can be performed by execution of computer-readable instructions included on a computer readable medium.

Turning now to both FIG. 3A and FIG. 10, the called number field 312 is populated and the call nature is designated as "F" to route calls to the mailbox greeting for the called party. As illustrated in block 1002, the call is routed to an open tree voicemail greeting, whereby a calling party is requested to enter a voicemail box number for the voicemail box that the calling party would like to access. The VMS 100 can present the voicemail greeting associated with the selected voicemail box, if any, at block 1004. The calling party can dictate a message and the message can be stored, for example, in the messages 122 of the memory 108, as illustrated at block 1006. The method 1000 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A voicemail system comprising:
a processor;
a communication interface that receives an incoming call and an address message comprising a called party number field, a calling party number field, an original called number field, and a redirecting number field; and
a memory having stored thereon a call treatment application that, when executed by the processor, causes the processor to perform operations comprising analyzing the address message to determine which rule, of a plurality of rules defined in a call nature table, to execute for handling the incoming call, the call nature table comprising a calling party number parameter, an original called party number parameter, a called party number parameter, a redirecting number parameter, a call nature parameter, and a scan parameter for each of the plurality of rules, and the plurality of rules comprising
a first rule that defines a first call handling treatment to be executed by the processor in response to the redirecting number field of the address message being populated with a redirecting number, wherein the call nature parameter of the first rule comprises an indication to route the incoming call to a designated voicemail box for voicemail message deposit, the scan parameter of the first rule instructs the processor to scan the redirecting number field of the address message to obtain the redirecting number for use as a voicemail box number of the designated voicemail box for voicemail message deposit to which the incoming call is to be routed, and the first call handling treatment, when executed by the processor, causes the voicemail system to route the incoming call to the designated voicemail box for voicemail message deposit using the redirecting number,
a second rule that defines a second call handling treatment to be executed by the processor in response to the calling party number field and the original called number field of the address message being populated with a same number, wherein the call nature parameter of the second rule comprises an indication to route the incoming call to a designated voicemail box for voicemail message retrieval, the scan parameter of the second rule instructs the processor to scan the calling party number field of the address message to obtain the same number for use as a voicemail box number of the designated voicemail box for voicemail message retrieval to which the incoming call is to be routed, and the second call handling treatment, when executed by the processor, causes the voicemail system to route the incoming call to the designated voicemail box for voicemail message retrieval using the same number,
a third rule that defines a third call handling treatment to be executed by the processor in response to the original called number field of the address message being populated with an original called number, wherein the call nature parameter of the third rule comprises the indication to route the incoming call to the designated voicemail box for voicemail message deposit, the scan parameter of the third rule instructs the processor to scan the original called number field of the address message to obtain the original called number for use as the voicemail box number of the designated voicemail box for voicemail message deposit to which the incoming call is to be routed, and the third call handling treatment, when executed by the processor, causes the voicemail system to route the incoming call to the designated voicemail box for voicemail message deposit using the original called number, a fourth rule that defines a fourth call handling treatment to be executed by the processor in response to a calling party mailbox and a called party mailbox being resident on the voicemail system and the calling party number field of the address message being populated with a calling party number, wherein the call nature parameter of the fourth rule comprises the indication to route the incoming call to the designated voicemail box for voicemail message deposit, the scan parameter of the fourth rule instructs the processor to scan the called party number field of the address message to obtain a deposit pilot number for use as the voicemail box number of the designated voicemail box for voicemail message deposit to which the incoming call is to be routed, and the fourth call handling treatment, when executed by the processor, causes the voicemail system to route the incoming call to the designated voicemail box for voicemail message deposit using the deposit pilot number without requiring the calling party to reenter the calling party number, a fifth rule that defines a fifth call handling treatment to be executed by the processor in response to the calling party number field of the address message being populated with a calling party number, wherein the call nature parameter of the fifth rule comprises the indication to route the incoming call to the designated voicemail box for voicemail message retrieval, the scan parameter of the fifth rule instructs the processor to scan the calling party number field of the address message to obtain the calling party number for use as the voicemail box number of the designated voicemail box for voicemail message retrieval to which the incoming call is to be routed, and the fifth call handling treatment, when executed by the processor, causes the voicemail system to route the incoming call to the designated voicemail box for voicemail message retrieval using the calling party number, and a sixth rule that defines a sixth call handling treatment to be executed by the processor in response to the called party number field being populated with a called party number, wherein the call nature parameter of the sixth rule comprises the indication to route the incoming call to the designated voicemail box for voicemail message deposit, the scan parameter of the sixth rule instructs the processor to scan the called party number field of the address message to obtain the called party number for use as the voicemail box number for the designated voicemail box for voicemail message deposit to which the incoming call is to be routed, and the sixth call handling treatment, when executed by the processor, causes the voicemail system to route the incoming call to the designated voicemail box for voicemail message deposit using the called party number and to present an open tree greeting that requests the calling party to enter a new voicemail box number for a voicemail box the calling party is attempting to access.

2. The voicemail system of claim 1, wherein the operations further comprise applying the first rule.

3. The voicemail system of claim 1, wherein the operations further comprise applying the second rule.

4. The voicemail system of claim 1, wherein the operations further comprise applying the third rule.

5. The voicemail system of claim 1, wherein the operations further comprise applying the fourth rule.

6. The voicemail system of claim 1, wherein the operations further comprise applying the fifth rule.

7. The voicemail system of claim 1, wherein the operations further comprise applying the sixth rule.

8. A method for operating a voicemail system to determine call handling treatment for an incoming call, the method comprising:

receiving an address message at the voicemail system, the address message comprising a called party number field, a calling party number field, an original called number field, and a redirecting number field; and analyzing, by the voicemail system, the address message to determine which rule, of a plurality of rules defined in a call nature table, to apply for handling the incoming call, the call nature table comprising a calling party number parameter, an original called party number parameter, a called party number parameter, a redirecting number parameter, a call nature parameter, and a scan parameter for each of the plurality of rules, and the plurality of rules comprising a first rule that defines a first call handling treatment to be applied for handling the incoming call in response to the redirecting number field of the address message being populated with a redirecting number, wherein the call nature parameter of the first rule comprises an indication to route the incoming call to a designated voicemail box for voicemail message deposit, the scan parameter of the first rule instructs the voicemail system to scan the redirecting number field of the address message to obtain the redirecting number for use as a voicemail box number of the designated voicemail box for voicemail message deposit to which the incoming call is to be routed, and the first call handling treatment causes the voicemail system to route the incoming call to the designated voicemail box using the redirecting number;

a second rule that defines a second call handling treatment to be executed by the processor in response to the calling party number field and the original called number field of the address message being populated with a same number, wherein the call nature parameter of the second rule comprises an indication to route the incoming call to a designated voicemail box for voicemail message retrieval, the scan parameter of the second rule instructs the processor to scan the calling party number field of the address message to obtain the same number for use as a voicemail box number of the designated voicemail box for voicemail message retrieval to which the incoming call is to be routed, and the second call handling treatment, when executed by the processor, causes the voicemail system to route the incoming call to the designated voicemail box for voicemail message retrieval using the same number, a third rule that defines a third call handling treatment to be executed by the processor in response to the original called number field of the address message being populated with an original called number, wherein the call nature parameter of the third rule comprises the indication to route the incoming call to the designated voicemail box for voicemail message deposit, the scan parameter of the third rule instructs the processor to scan the original called number field of the address message to obtain the original called number for use as the voicemail box number of the designated voicemail box for voicemail message deposit to which the incoming call is to be routed, and the third call handling treatment, when executed by the processor, causes the voicemail system to route the incoming call to the designated voicemail box for voicemail message deposit using the original called number, a fourth call handling treatment to be executed by the processor in response to a calling party mailbox and a called party mailbox being resident on the voicemail system and the calling party number field of the address message being populated with a calling party number, wherein the call nature parameter of the fourth rule comprises the indication to route the incoming call to the designated voicemail box for voicemail message deposit, the scan parameter of the fourth rule instructs the processor to scan the called party number field of the address message to obtain a deposit pilot number for use as the voicemail box number of the designated voicemail box for voicemail message deposit to which the incoming call is to be routed, and the fourth call handling treatment, when executed by the processor, causes the voicemail system to route the incoming call to the designated voicemail box for voicemail message deposit using the deposit pilot number without requiring the calling party to reenter the calling party number, a fifth call handling treatment to be executed by the processor in response to the calling party number field of the address message being populated with a calling party number, wherein the call nature parameter of the fifth rule comprises the indication to route the incoming call to the designated voicemail box for voicemail message retrieval, the scan parameter of the fifth rule instructs the processor to scan the calling party number field of the address message to obtain the calling party number for use as the voicemail box number of the designated voicemail box for voicemail message retrieval to which the incoming call is to be routed, and the fifth call handling treatment, when executed by the processor, causes the voicemail system to route the incoming call to the designated voicemail box for voicemail message retrieval using the calling party number, and a sixth rule that defines a sixth call handling treatment to be executed by the processor in response to the called party number field being populated with a called party number, wherein the call nature parameter of the sixth rule comprises the indication to route the incoming call to the designated voicemail box for voicemail message deposit, the scan parameter of the sixth rule instructs the processor to scan the called party number field of the address message to obtain the called party number for use as the voicemail box number for the designated voicemail box for voicemail message deposit to which the incoming call is to be routed, and the sixth call handling treatment, when executed by the processor, causes the voicemail system to route the incoming call to the designated voicemail box for voicemail message deposit using the called party number and to present an open tree greeting that requests the calling party to enter a new voicemail box number for a voicemail box the calling party is attempting to access.

9. The method of claim 8, further comprising applying the first rule.

10. The method of claim 8, further comprising applying the second rule.

11. The method of claim 8, further comprising applying the third rule.

12. The method of claim 8, further comprising applying the fourth rule.

13. The method of claim 8, further comprising applying the fifth rule.

14. The method of claim 8, further comprising applying the sixth rule.

15. A tangible computer-readable medium comprising computer-readable instructions that, when executed by a processor of a voicemail system, cause the processor to perform operations comprising:

receiving an incoming call;

receiving an address message comprising a called party number field, a calling party number field, an original called number field, and a redirecting number field; and analyzing the address message to determine which rule, of a plurality of rules defined in a call nature table, to apply for handling the incoming call, the call nature table comprising a calling party number parameter, an original called party number parameter, a called party number parameter, a redirecting number parameter, a call nature parameter, and a scan parameter for each of the plurality of rules, and the plurality of rules comprising a first rule that defines a first call handling treatment to be executed by the processor in response to the redirecting number field of the address message being populated with a redirecting number, wherein the call nature parameter of the first rule comprises an indication to route the incoming call to a designated voicemail box for voicemail message deposit, the scan parameter of the first rule instructs the processor to scan the redirecting number field of the address message to obtain the redirecting number for use as a voicemail box number of the designated voicemail box for voicemail message deposit to which the incoming call is to be routed, and the first call handling treatment, when executed by the processor, causes the voicemail system to route the incoming call to the designated voicemail box for voicemail message deposit using the redirecting number, a second rule that defines a second call handling treatment to be executed by the processor in response to the calling party number field and the original called number field of the address message being populated with a same number, wherein the call nature parameter of the second rule comprises an indication to route the incoming call to a designated voicemail box for voicemail message retrieval, the scan parameter of the second rule instructs the processor to scan the calling party number field of the address message to obtain the same number for use as a voicemail box number of the designated voicemail box for voicemail message retrieval to which the incoming call is to be routed, and the second call handling treatment, when executed by the processor, causes the voicemail system to route the incoming call to the designated voicemail box for voicemail message retrieval using the same number, a third rule that defines a third call handling treatment to be executed by the processor in response to the original called number field of the address message being populated with an original called number, wherein the call nature parameter of the third rule comprises the indication to route the incoming call to the designated voicemail box for voicemail message deposit, the scan parameter of the third rule instructs the processor to scan the original called number field of the address message to obtain the original called number for use as the voicemail box number of the designated voicemail box for voicemail message deposit to which the incoming call is to be routed, and the third call handling treatment, when executed by the processor, causes the voicemail system to route the incoming call to the designated voicemail box for voicemail message deposit using the original called number, a fourth call handling treatment to be executed by the processor in response to a calling party mailbox and a called party mailbox being resident on the voicemail system and the calling party number field of the address message being populated with a calling party number, wherein the call nature parameter of the fourth rule comprises the indication to route the incoming call to the designated voicemail box for voicemail message deposit, the scan parameter of the fourth rule instructs the processor to scan the called party number field of the address message to obtain a deposit pilot number for use as the voicemail box number of the designated voicemail box for voicemail message deposit to which the incoming call is to be routed, and the fourth call handling treatment, when executed by the processor, causes the voicemail system to route the incoming call to the designated voicemail box for voicemail message deposit using the deposit pilot number without requiring the calling party to reenter the calling party number, a fifth call handling treatment to be executed by the processor in response to the calling party number field of the address message being populated with a calling party number, wherein the call nature parameter of the fifth rule comprises the indication to route the incoming call to the designated voicemail box for voicemail message retrieval, the scan parameter of the fifth rule instructs the processor to scan the calling party number field of the address message to obtain the calling party number for use as the voicemail box number of the designated voicemail box for voicemail message retrieval to which the incoming call is to be routed, and the fifth call handling treatment, when executed by the processor, causes the voicemail system to route the incoming call to the designated voicemail box for voicemail message retrieval using the calling party number, and a sixth rule that defines a sixth call handling treatment to be executed by the processor in response to the called party number field being populated with a called party number, wherein the call nature parameter of the sixth rule comprises the indication to route the incoming call to the designated voicemail box for voicemail message deposit, the scan parameter of the sixth rule instructs the processor to scan the called party number field of the address message to obtain the called party number for use as the voicemail box number for the designated voicemail box for voicemail message deposit to which the incoming call is to be routed, and the sixth call handling treatment, when executed by the processor, causes the voicemail system to route the incoming call to the designated voicemail box for voicemail message deposit using the called party number and to present an open tree greeting that requests the calling party to enter a new voicemail box number for a voicemail box the calling party is attempting to access.

16. The tangible computer-readable medium of claim 15, wherein the operations further comprise applying the first rule.

17. The tangible computer-readable medium of claim 15, wherein the operations further comprise applying the second rule.

18. The tangible computer-readable medium of claim 15, wherein the operations further comprise applying the third rule.

19. The tangible computer-readable medium of claim 15, wherein the operations further comprise applying the fourth rule.

20. The tangible computer-readable medium of claim 15, wherein the operations further comprise applying the fifth rule or the sixth rule.

* * * * *